United States Patent
Chen et al.

(10) Patent No.: US 8,150,210 B2
(45) Date of Patent: Apr. 3, 2012

(54) IMAGE SYNTHESIS SYSTEM FOR A VEHICLE AND THE MANUFACTURING METHOD THEREOF

(75) Inventors: Yong-Sheng Chen, Taipei (TW); Yu-Chih Liu, Taipei (TW); Kai-Ying Lin, Taipei County (TW)

(73) Assignee: National Chiao Tung University, Hsinchu (TW)

( * ) Notice: Subject to any disclaimer, the term of this patent is extended or adjusted under 35 U.S.C. 154(b) by 932 days.

(21) Appl. No.: 12/101,325

(22) Filed: Apr. 11, 2008

(65) Prior Publication Data

US 2009/0175492 A1  Jul. 9, 2009

(30) Foreign Application Priority Data

Jan. 18, 2008  (TW) ................................ 97101954 A (51) Int. Cl.
*G06K 9/36* (2006.01)
(52) U.S. Cl. ...................................... 382/284; 340/937
(58) Field of Classification Search ............. 340/426.23, 340/435, 436, 437, 937, 995.17; 348/47, 348/143, 147, 148, 149, 159, 584, E5.03; 358/3.04, 3.24, 450; 382/104, 276, 284; 710/15
See application file for complete search history.

(56) References Cited

U.S. PATENT DOCUMENTS

| | | | |
|---|---|---|---|
| 5,670,935 A | 9/1997 | Schofield et al. | |
| 5,680,123 A | 10/1997 | Lee | |
| 5,982,951 A | 11/1999 | Katayama et al. | |
| 6,249,616 B1 * | 6/2001 | Hashimoto | 382/284 |
| 6,476,855 B1 | 11/2002 | Yamamoto | |
| 6,593,960 B1 * | 7/2003 | Sugimoto et al. | 348/148 |
| 6,895,106 B2 * | 5/2005 | Wang et al. | 382/132 |
| 6,919,917 B1 | 7/2005 | Janssen | |
| 7,139,412 B2 * | 11/2006 | Kato et al. | 382/104 |
| 7,881,559 B2 * | 2/2011 | Park et al. | 382/284 |
| 2002/0114536 A1 * | 8/2002 | Xiong et al. | 382/284 |
| 2005/0190082 A1 * | 9/2005 | Kumata et al. | 340/995.1 |
| 2005/0240342 A1 * | 10/2005 | Ishihara et al. | 701/208 |
| 2007/0229238 A1 * | 10/2007 | Boyles et al. | 340/435 |
| 2010/0194851 A1 * | 8/2010 | Pasupaleti et al. | 348/36 |

FOREIGN PATENT DOCUMENTS

JP  10117342 A  *  5/1998

* cited by examiner

*Primary Examiner* — Gregory F Cunningham
(74) *Attorney, Agent, or Firm* — Rosenberg, Klein & Lee (57) ABSTRACT

The present invention discloses an image synthesis system for a vehicle to provide the driver with a downward-facing image of the car's 360° surrounding view. The system includes: a first camera, which is used to shoot a first image of the periphery of the vehicle; a second camera, which is used to shoot a second image of the periphery of said vehicle, wherein the second image and the first image have an overlap region; an image processing device comprising a defining component and a synthesis component, which is used to synthesize the first image and the second image and output a third image; a display device, which is used to display the third image.

20 Claims, 6 Drawing Sheets

IMAGE SYNTHESIS SYSTEM FOR A VEHICLE AND THE MANUFACTURING METHOD THEREOF

FIELD OF THE INVENTION

The present invention relates to an image synthesis system for a vehicle. More particularly, it relates to a system which is disposed on a vehicle to provide the driver a downward-facing image of the vehicle's 360° surrounding view to monitor the periphery of the vehicle.

BACKGROUND OF THE INVENTION

A blind spot problem threatens the driver's safety, especially when driving a vehicle in complicated environments such as narrow alleys and parking lots. To ease this problem, one can mount a rear-view camera on the back of the vehicle for the driver being able to see the back while backing up. However, it is difficult for the driver to simultaneously monitor four sides of the vehicle and thus the potential risk of an accident is high.

U.S. Pat. No. 7,139,412 applied by Nissan disclosed a car surveillance system which comprises: mounting several cameras on a vehicle, shooting the images of the periphery of said vehicle, synthesizing all the images into one image and displaying said image on a screen installed in the car. However, if there is a 3D object presenting on the seams of the synthesized images, the edges of the object in one image will misalign to the edges in the other image, so that the systems can't provide accurate image data for the driver.

In view of the disadvantages, the present invention provides an image synthesis system for a vehicle and the manufacturing method thereof which comprises: shooting the images of the periphery of a vehicle by the cameras disposed on said vehicle, synthesizing the images into a downward-facing image, stitching of two adjacent images in a smooth and seamless manner, and displaying a high quality synthesized image on a display device, to provide a better monitoring experience to the driver.

SUMMARY OF THE INVENTION

The present invention provides an image synthesis system for a vehicle and the manufacturing method thereof based on the problems stated above.

One object of the present invention is to provide an image synthesis system for a vehicle, capable of providing a high quality synthesized image of 360° surrounding view of the vehicle to provide a better monitoring experience.

Another object of the present invention is to provide an image synthesis system for a vehicle, which applies the techniques in computer science category, capable of making the stitching of two adjacent images smooth and seamless.

Based on the objects stated above, the image synthesis system for a vehicle of the present invention comprises: a first camera, a second camera, an image processing device, and a display device. Said image processing device comprises: a defining component, a synthesis component, a transformation component, a seam registration component, and a deformation component. The first camera is disposed on a vehicle and shoots a first image of the periphery of the vehicle; the second camera is disposed on the vehicle and shoots a second image of the periphery of the vehicle, wherein the second image and the first image have an overlap region; the transformation component of the image processing device is for transforming the first image and second image into a downward-facing image, and the synthesis component is for synthesizing the first image and the second image and outputting a third image. To generate the third image, first, the defining component defines the first image into a plurality of first points and defines the second image into a plurality of second points, wherein each point has a residual error. When the first point overlaps to the second point, the point with lower residual error will be shown on the third image. The third image has an optimal stitching seam between the synthesized first image and second image, wherein at least one object presents on the seam and the edges of the object in the first image are misaligned to the edges in the second image. To solve this problem, the seam registration component of the image processing device is provided to align the edges of the object on the seam. The image processing device further comprises the deformation component to propagate the alignment of the edges of the object to the rest of the first image and the second image, and to output a complete third image.

The present invention further provides an image synthesis method for a vehicle which comprises the following steps: shooting a fist image of the periphery of a vehicle, shooting a second image of the periphery of said vehicle, transforming the first image and second image into a downward-facing image, processing the image to synthesize the first image and the second image and to output a third image, and displaying the third image. Processing the image further comprises: defining the first image into a plurality of first points and defining the second image into a plurality of second points each having a residual error, synthesizing the first image and the second image and outputting a third image, aligning the edges of the object on the seam, and deforming the first image and the second image by propagating the alignment of the edges of the object to the rest of the first image and the second image. Below is the process of the steps. First, using the first camera to shoot a first image of the periphery of the vehicle, and using the second camera to shoot the second image of the periphery of the vehicle, wherein the second image has an overlap region with the first image; transforming the first image and second image into a downward-facing image; then synthesizing the first image and the second image and outputting a third image. To generate the third image, first, define the first image into a plurality of first points and define the second image into a plurality of second points, wherein each point has a residual error. When the first point overlaps to the second point, the point with lower residual error will be shown on the third image. The third image has an optimal stitching seam between the synthesized first image and second image, wherein at least one object presents on the seam and the edges of the object in the first image are misaligned to the edges in the second image. Therefore, the step to align the edges of the object on the two sides of the seam is required. And then the next is to propagate the alignment of the edges of the object to the rest of the first image and the second image and to generate a complete third image.

The present invention further provides an image synthesis device for synthesizing a first image and a second image, wherein the first image is taken by a first camera disposed on a vehicle, and the second image is taken by a second camera disposed on the vehicle, and the second image and the first image have an overlap region, the image synthesis device comprising: a defining component for defining the first image and second image into a plurality of points, each point has a residual error; a synthesis component for synthesizing the first image and the second image and outputting a third image, wherein when the first point overlaps to the second point, the point with lower residual error will be shown on the third image. The image synthesis device further includes a transformation component for transforming the first image and the second image into a downward-facing image. The third image has at least a seam between the synthesized first image and second image, wherein at least one object presents on the seam and the edges of the object in the first image misaligned to the edges in the second image. Therefore, the image synthesis device further includes a seam registration component for aligning the edges of the object of the two sides of said seam. The image synthesis device further includes a deformation component for propagating the alignment to the rest of the first image and the second image and outputting a complete third image.

The present invention further provides an image synthesis method for synthesizing a first image and a second image, wherein the first image is taken by a first camera disposed on a vehicle, and the second image is taken by a second camera disposed on the vehicle, and the second image and the first image have an overlap region, the image synthesis method comprising: defining the first image and the second image into a plurality of points and each point has a residual error; synthesizing the first image and the second image and outputting a third image, wherein when the first point overlaps to the second point, only the point with lower residual error will be shown on the third image. The image synthesis method further includes transforming the first image and second image into a downward-facing image. The third image has an optimal stitching seam between the synthesized first image and second image, wherein at least one object presents on the seam and the edges of the object in the first image misaligned to the edges in the second image. Therefore the method comprises aligning the edges of the object on the seam. The image synthesis method further comprises deforming the first image and the second image by propagating the alignment of seam to the rest of the first image and the second image and outputting a complete third image.

DETAILED DESCRIPTION OF THE EMBODIMENTS

Figure 1:
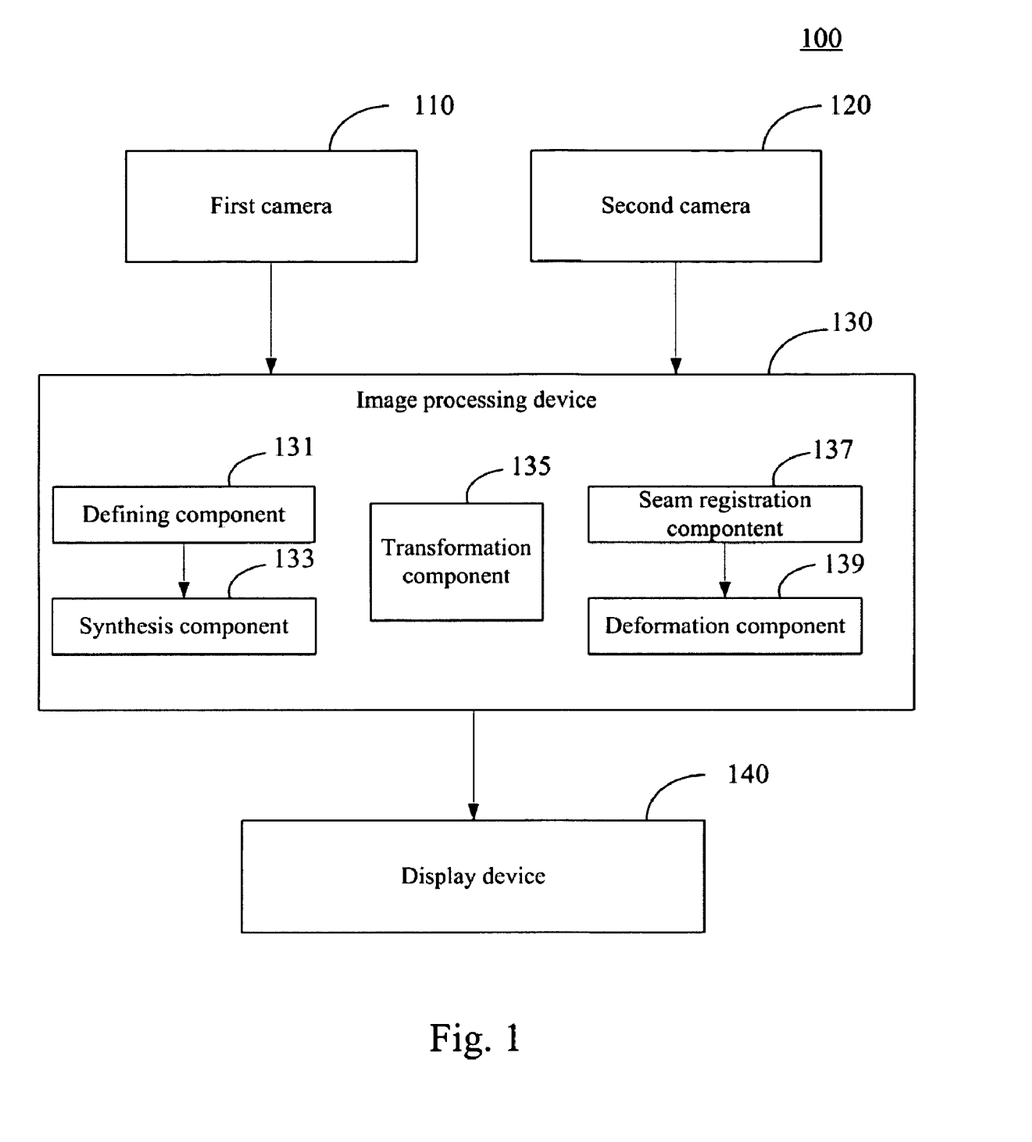
FIG. 1 a block diagram of an embodiment of the image synthesis system for a vehicle in accordance with the present invention.
Figure 2:
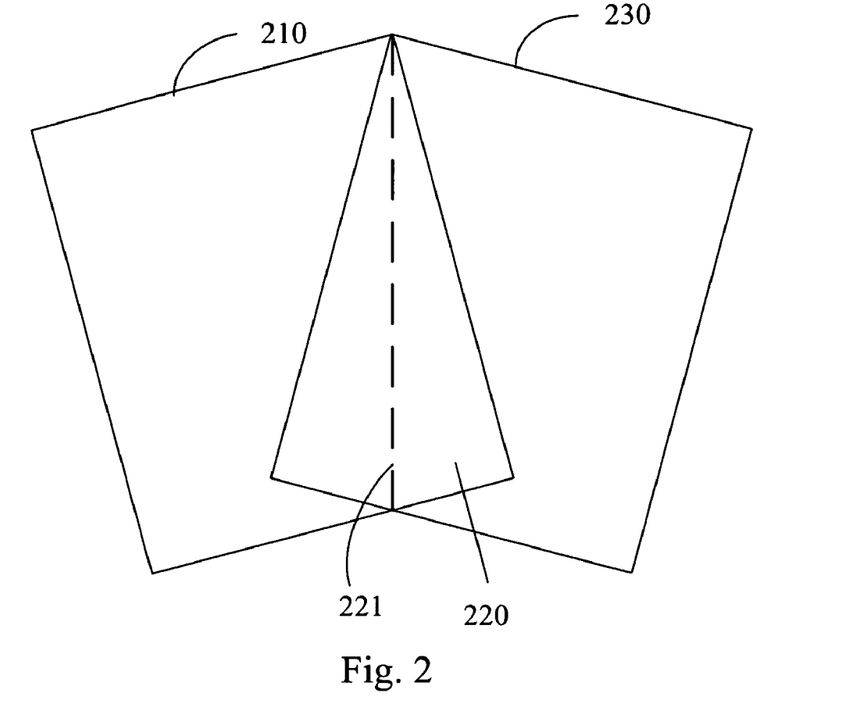
FIG. 2 illustrates the first image taken by the first camera and the second image taken by the second camera and the overlap region of the two images and the seam.
Figure 3:
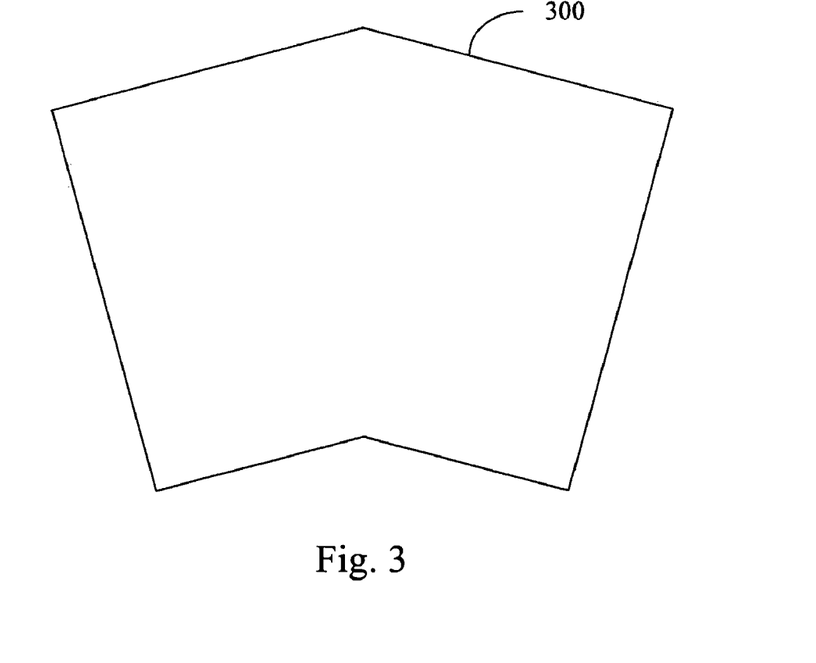
FIG. 3 illustrates the third image synthesized by the first image and the second image.

Refer to FIG. 1, FIG. 2, and FIG. 3. In accordance with one embodiment of the present invention an image synthesis system for vehicle 100, comprises: a first camera 110, a second camera 120, an image processing device 130, and a display device 140. Said image processing device comprises: a defining component 131, a synthesis component 133, a transformation component 135, a seam registration component 137, and a deformation component 139. The first camera 110 is disposed on a vehicle and shooting a first image 210 of the periphery of the vehicle; the second camera 120 is disposed on the vehicle and shooting a second image 230 of the periphery of the vehicle, wherein the second image and the first image have an overlap region 220; the transformation component 135 of the image processing device is for transforming the first image and second image into a downward-facing image, and then using the synthesis component 133 to synthesize the first image and the second image and output a third image 300. To generate the third image, first, the defining component 131 defines the first image 210 into a plurality of first points 211 and defines the second image 230 into a plurality of second points 231, wherein each point has a residual error. When the first point 211 overlaps to the second point 231, the point with lower residual error will be shown on the third image. Therefore, the third image has at least one seam 221 between the synthesized first image and second image, wherein at least one object presents on the seam and the edges of the object in the first image misaligned to the edges in the second image. Therefore, the seam registration component 137 of the image processing device is required to align the edges of the object on the seam. Furthermore, the image processing device includes the deformation component 139 to propagate the alignment of the edges of the object to the rest of the first image and the second image, and to output a complete third image.

Figure 4:
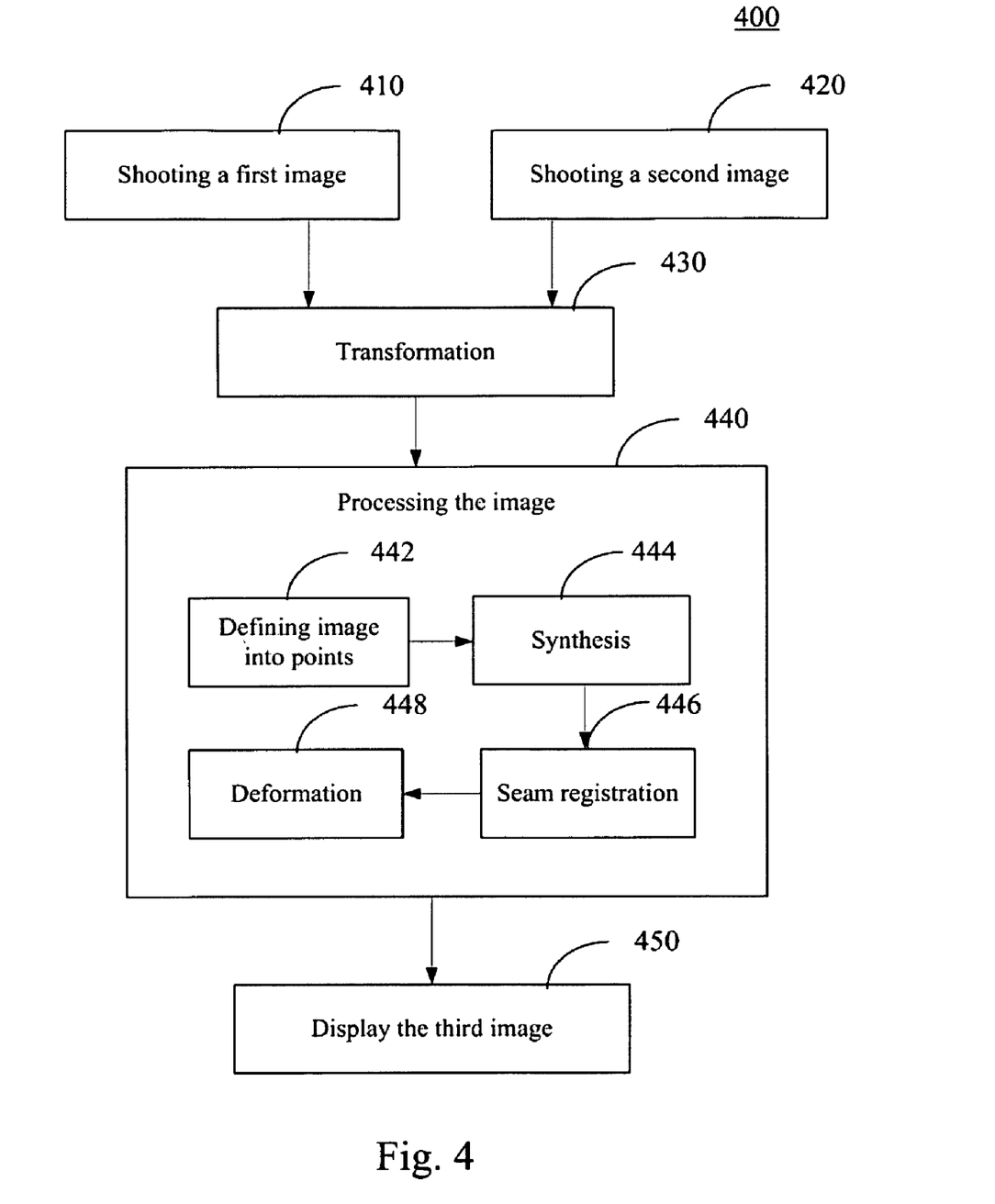
FIG. 4 a flow chart of an embodiment of the image synthesis method for a vehicle in accordance with the present invention.

Refer to FIG. 4, which illustrates an image synthesis method for a vehicle 400 in accordance with one embodiment of the present invention and comprises the following steps: shooting a first image of the periphery of a vehicle 410, shooting a second image of the periphery of said vehicle 420, transforming the first image and second image into a downward-facing image 430, processing the image to synthesize the first image and the second image and to output a third image 440, and displaying the third image 450. Processing the image 440 further comprises: defining the first image into a plurality of first points and defining the second image into a plurality of second points each having a residual error 442; synthesizing the first image and the second image and outputting a third image 444, wherein when the first point overlaps with the second point, the point with lower residual error will be shown on the third image; aligning the edges of the object present on the seam 446; and deforming the first image and the second image by propagating the alignment of the edges of the object to the rest of the first image and the second image 448.

Figure 5:
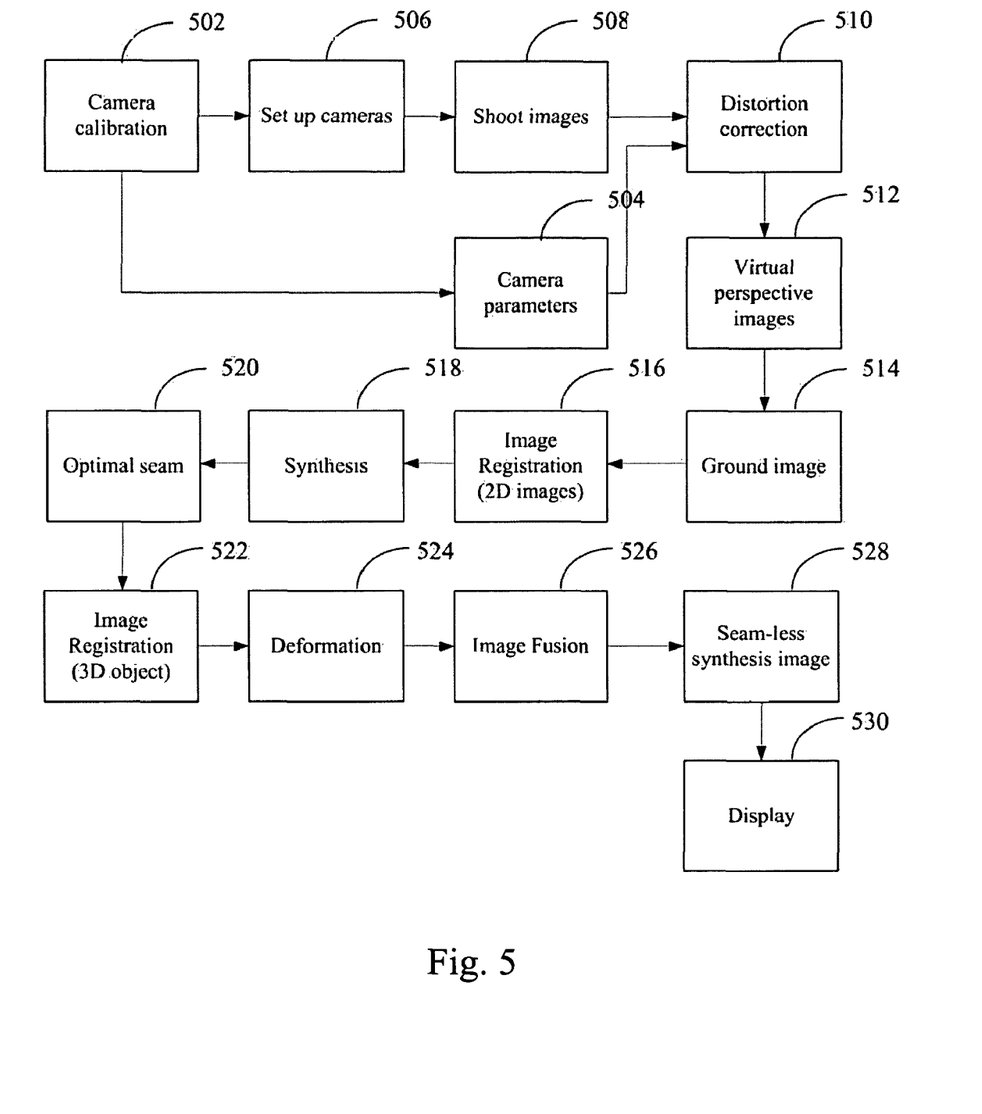
FIG. 5 a detailed flow chart of an embodiment of the image synthesis method for a vehicle in accordance with the present invention.

FIG. 5 illustrates the detailed steps of this embodiment, and the explanation is made by referring to both FIGS. 4 and 5. Refer to FIG. 5. First, the step 502 is for calibrating the cameras, and extracting the cameras' intrinsic parameters and extrinsic parameters (step 504). Next, set up the calibrated cameras on the vehicle (step 506) to take the images of the periphery of the vehicle (step 508). Step 508 refers to steps 410 and 420 in FIG. 4. Use the camera parameters from step 504 and correct the distortion of the images from step 508 (step 510) to get a perspective projection image (step 512). Shoot a ground image from the top of the vehicle beforehand (step 514). Register the images from step 508 and image from step 514 (step 516), and then combine the images from step 508 to a downward-facing image (step 518). The steps 514-518 refer to the step 430 in FIG. 4. The two images taken from conjunct cameras have an overlap region, wherein an optimal stitching seam is able to be found. To do so, first, define the two images into a plurality of points (step 442), wherein each point has a residual error. Select a seam which consists of points with the lowest residual error (step 221), and then stitch the two images to output a third image (step 444).

Figure 6:
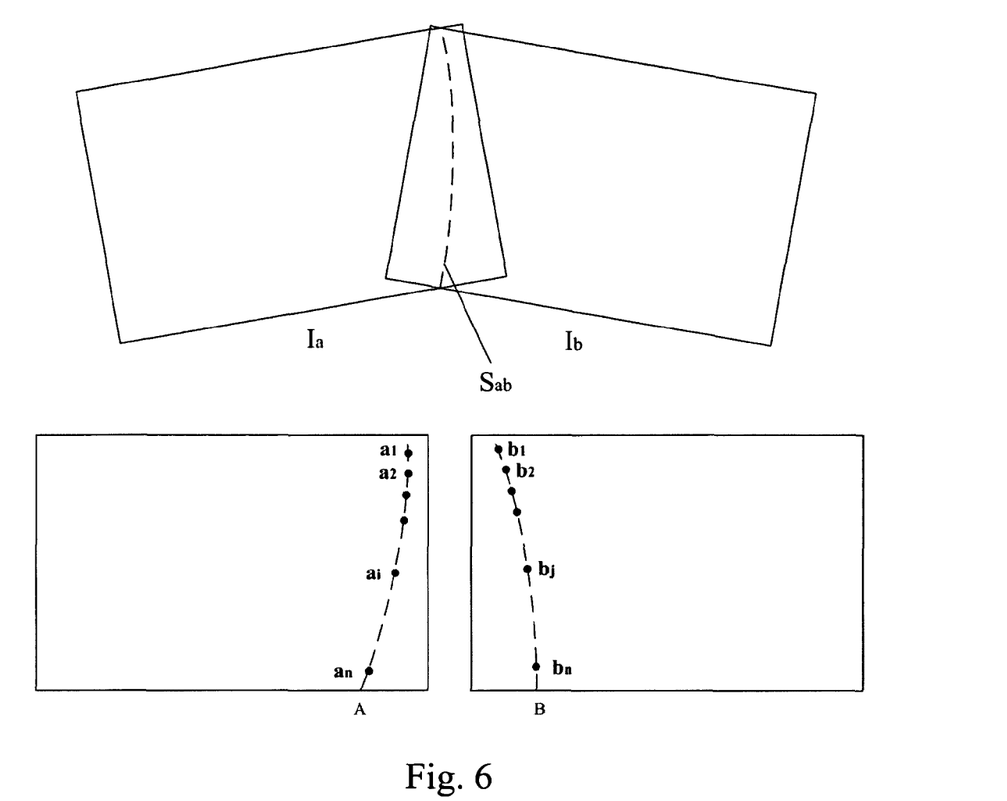
FIG. 6 illustrates the seam and the data sequences A and B coming from different resources along the seam.
Figure 7:
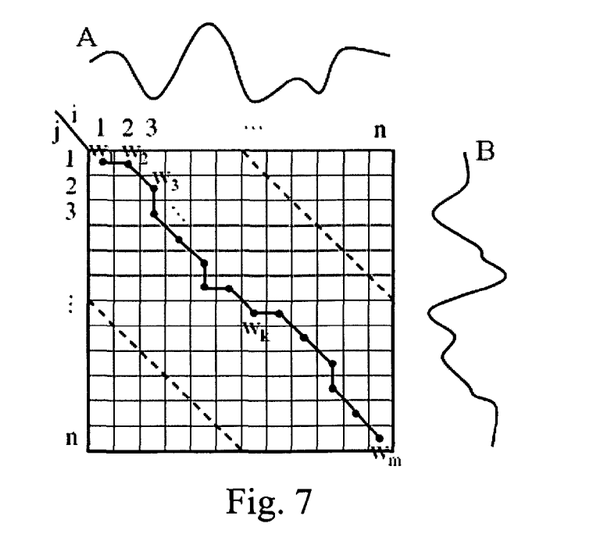
FIG. 7 illustrates the warping path starts from $w_1=(1, 1)$ and ends at $w_m=(n, n)$.

Following the steps stated above enables one to stitch multiple partial scene images of the periphery of the vehicle and output a complete downward-facing surrounding view image. Since the transformation method is based on the homography matrix, which is used for image registration on a planar surface, therefore, an object's edges of the two sides of the seam will misalign if there is a 3D object presenting on the stitching seam. To solve this problem, image registration is required (step 446). In this embodiment, dynamic image warping (DIW) is applied. Refer to FIG. 6. Suppose there are two images Ia and Ib stitched together on the seam Sab. Since the seam lies in the overlap region of Ia and Ib, two series of pixel data A and B are obtained which come from Ia and Ib along Sab $$A = a_1, a_2, \ldots, a_i, \ldots, a_n \tag{1}$$

$$B = b_1, b_2, \ldots, b_j, \ldots, b_n, \tag{2}$$

where n is the length of Sab in pixels. Refer to FIG. 7. To align two sequences using DIW, an n×n matrix is constructed where the (i, j) element of the matrix contains the difference value $d(a_i, b_j)$ between the two nodes $a_i$ and $b_j$. A warping path W is a set of matrix elements that describes a mapping between A and B.

$$W = w_1, w_2, \ldots, w_k, \ldots, w_m, n \leq m \leq 2n-1 \tag{3}$$

The warping path is typically subject to the following constraints.

(1) Boundary Condition

The warp path must start in $w_1=(1, 1)$ and finish in $w_m=(n, n)$. These two elements are the opposite corner elements of the matrix. In other words, the starting nodes of both sequences must be registered together, same as the ending nodes.

(2) Continuity

Given $w_k=(p, q)$ and $w_{k-1}=(p', q')$ where $p-p' \leq 1$ and $q-q' \leq 1$, this constraint restricts the warp path to step forward only into the adjacent element, and diagonally adjacent elements are also included.

(3) Monotonicity

Given $w_k=(p, q)$ and $w_{k-1}=(p', q')$ where $p-p' \geq 0$ and $q-q' \geq 0$, this constraint forces the points in W to be monotonically spaced in the spatial domain.

There are exponentially many warping paths that satisfy the above constraints. However, we are interested only in the warping path that minimizes the warping cost C. Equation (4) is used to calculate the C.

$$C(i, j) = D(a_i, b_j) + H(a_i, b_j) + \min \begin{cases} C(i, j-1) + p_v \\ C(i-1, j-1) \\ C(i-1, j) + p_h \end{cases} \tag{4}$$

$$C(1, 1) = 0$$

where $p_h$ and $p_v$ are the standard deviation of data sequence A and B, and $D(a_i, b_j)$ is the difference measurement between data point $a_i$ and $b_j$. This difference is composed of two terms, the difference of absolute values and the difference of first derivative angles, and can be written as $$D(a_i, b_j) = d(a_i, b_j) + d'(a_i, b_j) \tag{5}$$

where $$d(a_i, b_j) = (a_i, b_j)^2 \tag{6}$$

$$d'(a_i, b_j) = (ac \tan(a_i') - ac \tan(b_j')) \tag{7}$$

$$q_i' = \frac{(q_i - q_{i-1}) + \left(\frac{q_{i+1} - q_{i-1}}{2}\right)}{2}. \tag{8}$$

Equation (8) is from Derivative Dynamic Time Warping (DDTW) proposed by Keogh et al. which is the improvement of Dynamic Time Warping (DTW), and is used to consider the shape-level of pixel data for image registration. Equation (7) inherits DDTW. The results from Equations (6) and (7) are required to be normalized to 0~1. Moreover, the history of the seam registrations are also taken into consideration and $H(a_i, b_j)$ can be written as:

$$H(a_i, b_j) = s((i - h_b(f, j))^2 + (j - h_a(f, i))^2) \tag{9}$$

where $h_a(f, i)$ is the average index of the corresponding point in data series B to the j-th point in data series A in f previous frames, $h_b(f, j)$ is the average index of the corresponding point in data series A to the jth point in data series B in f previous frames, and s is a scalar. As s increases, the result of Equation (9) in the current frame has a bias to the history of the seam registration.

Please refer to FIG. 4 and FIG. 5. Once the seams of the adjacent images is aligned, the next step is to propagate this alignment result to the rest of the images through the image deformation method. In general, image deformation is accomplished by the transformation function T(x). The transformation function T(x)=based on point-landmarks must map the landmark $p_i=(p_{ix}, p_{iy}) \in \Box^2$ in the source image to its landmark $q_i=(q_{ix}, q_{iy}) \in \Box^2$ in the target image and can be written as:

$$T(p_i) = q_i, i = 1, \ldots, n, \tag{10}$$

where n is the number of the landmarks. The transformation functions in two coordinates are calculated separately.

$$T(p_i) = (t_x(p_{ix}), t_y(p_{iy})) \tag{11}$$
$$= (q_{ix}, q_{iy}),$$
$$i = 1, \ldots, n,$$

where $t_x(.)$ and $t_y(.)$ are the transformation functions in the x and y coordinates, respectively. In radial basis function approach, the transformation is composed by two terms as follow:

$$t(x) = R_s(x) + L_s(x), \tag{12}$$

where $R_s(x)$ is the non-linear term which consists of the weighted radial basis functions (RBFs), and $L_s(x)$ is the linear term which consists of m bases of polynomials up to degree d:

$$R_s(x) = \sum_{i=1}^{n} \alpha_i R(\|x - p_i\|), \tag{13}$$

$$L_s(x) = \sum_{j=1}^{m} \beta_j L_j(x), \tag{14}$$

Where $\alpha_i$ and $\beta_j$ are coefficients and $R(\|x-p_i\|)$ is the RBF centered around landmark $p_i$ with its value only depending on the Euclidean distance from x to $p_i$. In order to preserve the overall smoothness as much as possible, the coefficient $\alpha_i$ is typically subject to the following constraint:

$$\sum_{i=1}^{n} \alpha_i L_j(p_i) = 0, \ j = 1, \ldots, m. \tag{15}$$

A linear combination of the coefficients $\alpha=[\alpha_1 \ldots \alpha_n]^T$ and $\beta=[\beta_1 \ldots \beta_m]_T$ can be derived from the above equations and written as follows:

$$\begin{bmatrix} K & P \\ P^T & 0 \end{bmatrix} \begin{bmatrix} \alpha \\ \beta \end{bmatrix} = \begin{bmatrix} q \\ 0 \end{bmatrix}, \tag{16}$$

where K is the n×n sub-matrix which consists of $K_{ij}=R(\|P_i-P_j\|)$, P is the n×m sub-matrix which consists of $P_{ij}=L_j(P_i)$, and $q=[q_1 \ldots q_n]^T$ is the target sub-matrix.

Types of RBF will affect the registration result. In this embodiment, Wendland's RBFs are adopted and can be written as:

$$\psi_{d,k}(r)=I^k(1-r)_+^{\lfloor d/2 \rfloor+k+1}(r), \tag{17}$$

where $$(1-r)_+^v = \psi(r) = \begin{cases} (1-r)^v, & 0 \le r < 1 \\ 0, & r \ge 1 \end{cases} \tag{18}$$

$$I\psi(r) = \int_r^{\infty} t\psi(t)dt, \ r \ge 0. \tag{19}$$

Fornefett et al. proposed the method of compact support, where they use Wendland's RBFs for elastic registration. The Wendland's RBFs have compact support by scaling the weight of r and can be written as follows:

$$\psi_{d,k,s}(r) = \psi_{d,k}\left(\frac{r}{s}\right), \tag{20}$$

where s is the length of the spatial support. This approach limits the locality of each landmark in a circle with radius s.

The images to be deformed in this application are 2D images. To create the smooth deformation, $\psi_{2,1}(r)$ is adopted as RBF as follows:

$$\psi_{2,1}(r)=(1-r)_+^4(4r+1). \tag{21}$$

After finishing the deformation (step 524), all edges crossing the seams could be stitched together on the seams. But the seams may be visible and obvious, since the images being stitched might not be taken with the same exposure. In order to compensate exposure difference, the bias and gain model is adopted to adjust the global exposure:

$$I'_i=\alpha_i I+\beta_i, \tag{22}$$

where $\beta$ is the bias and $\alpha$ is the gain. The bias and gain for each image can be obtained in the least squares manner:

$$E_i = \sum_j \sum_p [\alpha_i I_i(H_{ir}p) + \beta_i - I_j(H_{jr}p)]^2, \tag{23}$$

where image $I_j$ is the adjacent image of image $I_i$, and p is the image point in the overlap of image $I_i$ and image $I_j$. In this approach, the images can be adjusted into similar exposure. But the seams may be still visible. Hence, an image fusion method based on the weighted blending to smooth the seams is proposed. The residual error of camera calibration is used as the weight to blend the source images of the same pixels in the final composite. Though the weights of both image sources are equal along the seam, the weighting function is not continuous between the overlapping region and non-overlapping region. Further, taking the minimum distance to images boundary into the weighting function, the proposed blending function can be formulated as $$I(p) = \frac{\sum_i E_i(H_{ir}p)B(H_{ir}p)I_i(H_{ir}p)}{\sum_i E_i(H_{ir}p)B(H_{ir}p)}, \tag{24}$$

$$B(u,v) = \left(1 - \left|\frac{2u}{\text{width}} - 1\right|\right)\left(1 - \left|\frac{2v}{\text{height}} - 1\right|\right), \tag{25}$$

where I(.) is the image of the final composite, $E_i(.)$ is the calibration error function of the camera i, width×height is the resolution of images, and B(.,.) is the weighting function with its value 1 on the image center and 0 on the image boundary. After image fusion (step 526), a seam-free synthesized image is outputted (step 528). Finally, display the image (step 530), which refers to the step 450 in FIG. 4.

Figure 8:
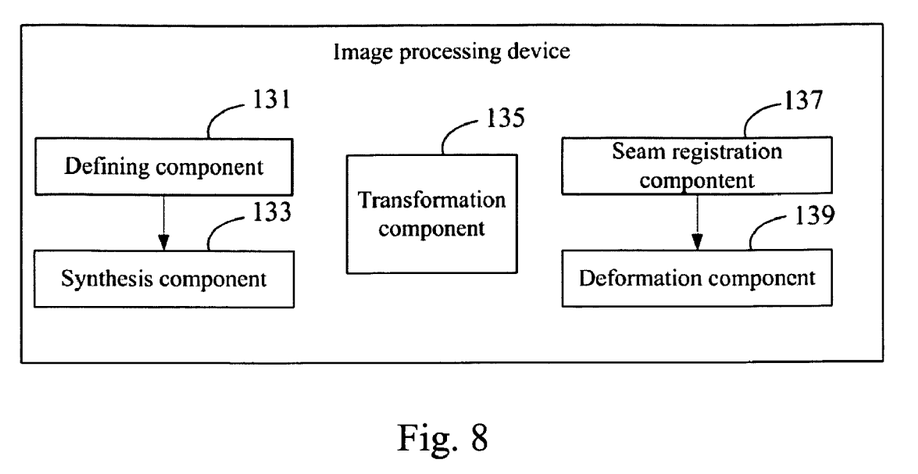
FIG. 8 a block diagram of an embodiment of the image synthesis device in accordance with the present invention.

Refer to FIG. 8. In accordance with one embodiment of the present invention, an image synthesis device for synthesizing a first image 210 and a second image 230, wherein the first image is taken by a first camera disposed on a vehicle, and the second image is taken by a second camera disposed on the vehicle, and the second image and the first image have an overlap region 220, the image synthesis device comprising: a defining component 131 for defining the first image 210 and second image 230 into a plurality of points, each point has a residual error; a synthesis component 133 for synthesizing the first image and the second image and outputting a third image, wherein when the first point overlaps to the second point, the point with lower residual error will be shown on the third image 300. The image synthesis device further includes a transformation component 135 for transforming the first image and the second image into a downward-facing image. The third image 300 has at least a seam 221 between the synthesized first image and second image, wherein at least one object is present on the seam and the edges of the object in the first image are misaligned to the edges in the second image. Therefore, the image synthesis device further includes a seam registration component 137 for aligning the edges of the object of the two sides of said seam. The image synthesis device further includes a deformation component 139 for propagating the alignment to the rest of the first image and the second image and outputting a complete third image.

Figure 9:
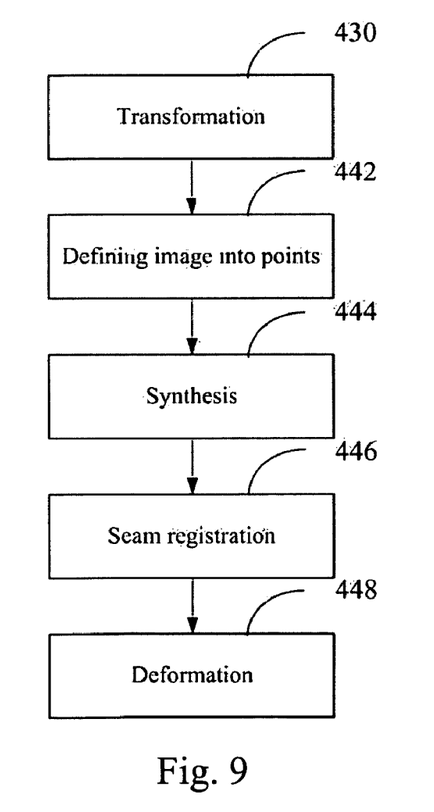
FIG. 9 a flow chart of an embodiment of the image synthesis method in accordance with the present invention.

Refer to FIG. 9. In accordance with one embodiment of the present invention, an image synthesis method for synthesizing a first image 210 and a second image 230, wherein the first image is taken by a first camera disposed on a vehicle, and the second image is taken by a second camera disposed on the vehicle, and the second image and the first image have an overlap region 220, the image synthesis method comprising: transforming the first image and second image into a downward-facing image 430; defining the first image and the second image into a plurality of points and each point has a residual error 442; synthesizing the first image and the second image and outputting a third image 444, wherein when the first point 211 overlaps to the second point 231 only the point which has lower residual error will be shown in the third image 300; aligning the edges of 3D objects on the seam 446; and deformation 448. Using the cameras disposed on a vehicle to get the first image 210 and second image 230, and then register the two images with the ground image taken beforehand. Synthesize the images into a downward-facing image (step 430). The images taken from two conjunct cameras will have an overlap region, and there is at least one seam (221) between the synthesized first image and second image. To find the optimal seam, first, defining the first image and second image into a plurality of points (step 442), each point has a residual error. Stitch the two images along the optimal seam, and then get a third image 300 (step 444). After the steps stated above, the partial scene images of the periphery of the vehicle can be synthesized into a complete surrounding view image. Suppose a 3D object is present on the seam 221, the edges of the objects in the first image will misalign to the edges in the second image. In view of this problem, the method further comprises image registration 446, to align the edges of the object in different images. In this embodiment, dynamic image warping (DIW) has been adopted. The method further comprises deforming the first image and the second image by propagating the alignment on the seam to the rest of the first image and the second image and outputting a complete third image (step 448). Finally, using weighted blending to compensate the exposure difference.

The present invention has been described in details through the embodiments and the accompanying drawings. However, those skilled in the art should know that these embodiments are for illustration purpose only, and are not meant to limit the present invention. Any modifications or changes made to the embodiment are within the scope and spirit of the present invention. The present invention is set forth in the attached claims.

What is claimed is:

1. An image synthesis system for a vehicle comprising:
a first camera disposed on the vehicle and shooting at least a first image of at least a first portion of an outward periphery of said vehicle;
a second camera disposed on the vehicle and shooting at least a second image of at least a second portion of the outward periphery of said vehicle, wherein the second image and the first image have an overlapping region;
an image processing device comprising:
a defining component operable to define the first image into a plurality of first points each having a first residual error, and defining the second image into a plurality of second points each having a second residual error; and,
a synthesis component operable to synthesize the first image and the second image and output a third image, wherein each point of the overlapping region of the third image is selected from one of the plurality of first points and a spatially corresponding one of the plurality of second points responsive, at least in part, to a determination of which point has lower residual error to thereby be shown in the third image; and
a display device for displaying at least the third image.

2. According to the system as claimed in claim 1, wherein the third image has at least a seam between the first image and second image.

3. According to the system as claimed in claim 2, wherein at least one object is present on the seam and the edges of the object in the first image are misaligned to the edges in the second image, and the image processing device further comprises a seam registration component for aligning the edges of the object on the seam.

4. According to the system as claimed in claim 3, the image processing device further comprises a deformation component for deforming the first image and the second image by propagating the alignment of the seam to the rest of the first image and the second image.

5. According to the system as claimed in claim 1, wherein the image processing device further comprises a transformation component for transforming the first image and second image into a downward-facing image.

6. An image synthesis method for a vehicle, the method comprising:
shooting at least a first image of at least a first portion of an outward periphery of said vehicle by a first camera disposed on the vehicle;
shooting at least a second image of at least a second portion of the outward periphery of said vehicle by a second camera disposed on the vehicle, wherein the second image and the first image have an overlapping region;
processing the image comprising:
defining the first image into a plurality of first points each having a first residual error, and defining the second image into a plurality of second points each having a second residual error; and
synthesizing the first image and the second image and outputting a third image, wherein each point of the overlapping region of the third image is selected from one of the plurality of first points and a spatially corresponding one of the plurality of second points responsive, at least in part, to a determination of which point has lower residual error to thereby be shown in the third image; and
displaying at least the third image.

7. According to the method as claimed in claim 6, wherein the third image has at least a seam between the first image and second image.

8. According to the method as claimed in claim 7, wherein at least one object is present on the seam and the edges of the object in the first image are misaligned to the edges in the second image, and the method further comprises aligning the edges of the object on the seam.

9. According to the method as claimed in claim 8, the method further comprises deforming the first image and the second image by propagating the alignment of the seam to the rest of the first image and the second image.

10. According to the method as claimed in claim 6, further comprising transforming the first image and second image into a downward-facing image.

11. An image synthesis device for synthesizing at least a first image and at least a second image, wherein the first image is taken by a first camera disposed on a vehicle, and the second image is taken by a second camera disposed on the vehicle, and the second image and the first image have an overlapping region, the image synthesis device comprising:
a defining component for defining the first image into a plurality of first points each having a first residual error, and defining the second image into a plurality of second points each having a second residual error; and a synthesis component for synthesizing the first image and the second image and output a third image, wherein each point of the overlapping region of the third image is selected from one of the plurality of first points and a spatially corresponding one of the plurality of second points, responsive, at least in part, to a determination of which point has lower residual error to thereby be shown in the third image.

12. According to the device as claimed in claim 11, wherein the third image has at least a seam between the first image and second image.

13. According to the device as claimed in claim 12, wherein at least one object is present on the seam and the edges of the object in the first image are misaligned to the edges in the second image, and the device further comprises a seam registration component for aligning the edges of the object on the seam.

14. According to the device as claimed in claim 13, further comprising a deformation component for deforming the first image and the second image by propagating the alignment of the seam to the rest of the first image and the second image.

15. According to the device as claimed in claim 11, further comprising a transformation component for transforming the first image and second image into a downward-facing image.

16. An image synthesis method for synthesizing at least a first image and at least a second image, wherein the first image is taken by a first camera disposed on a vehicle, and the second image is taken by a second camera disposed on the vehicle, and the second image and the first image have an overlapping region, the image synthesis method comprising:

defining the first image into a plurality of first points each having a first residual error, and defining the second image into a plurality of second points each having a second residual error; and synthesizing at least the first image and the second image and outputting at least a third image, wherein each point of the overlapping region of the third image is selected from one of the plurality of first points and a spatially corresponding one of the plurality of second points, responsive, at least in part, to a determination of which point has lower residual error to thereby be shown in the third image.

17. According to the method as claimed in claim 16, wherein the third image has at least a seam between the first image and second image.

18. According to the method as claimed in claim 17, wherein at least one object is present on the seam and the edges of the object in the first image are misaligned to the edges in the second image, and the method further comprising aligning the edges of the object on the seam.

19. According to the method as claimed in claim 18, further comprising deforming the first image and the second image by propagating the alignment of the seam to the rest of the first image and the second image.

20. According to the method as claimed in claim 16, further comprising transforming the first image and second image into a downward-facing image.

\* \* \* \* \*